United States Patent
Tran et al.

(10) Patent No.: US 6,263,424 B1
(45) Date of Patent: *Jul. 17, 2001

(54) EXECUTION OF DATA DEPENDENT ARITHMETIC INSTRUCTIONS IN MULTI-PIPELINE PROCESSORS

(75) Inventors: Dzung X. Tran, San Jose; Kenneth K. Munson, Saratoga, both of CA (US)

(73) Assignee: Rise Technology Company, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,164

(22) Filed: Aug. 3, 1998

(51) Int. Cl.$^7$ ..................................................... G06F 9/302
(52) U.S. Cl. ............................................ 712/221; 708/706
(58) Field of Search .............................. 708/706; 712/721

(56) References Cited

U.S. PATENT DOCUMENTS

| | | | |
|---|---|---|---|
| 3,771,138 | * 11/1973 | Celtruda et al. | 712/205 |
| 3,787,673 | * 1/1974 | Watson et al. | 708/521 |
| 3,863,061 | * 1/1975 | Kazantzis et al. | 708/706 |
| 3,875,391 | * 4/1975 | Shapiro et al. | 708/521 |
| 4,075,704 | * 2/1978 | O'Leary | 708/507 |
| 4,580,215 | * 4/1986 | Morton | 712/13 |
| 5,301,341 | 4/1994 | Vassiliadis et al. | 712/215 |
| 5,465,224 | 11/1995 | Guttag et al. | 708/236 |

* cited by examiner

Primary Examiner—David Y. Eng
(74) Attorney, Agent, or Firm—Oblon, Spivak, McClelland, Maier & Neustadt, P.C.

(57) ABSTRACT

A single chip microprocessor has at least two parallel pipelines that each have multiple processing stages, one of which is an instruction execution stage with a full functioned arithmetic logic unit (ALU). The ALU of one pipeline includes an adder that has the usual two input ports while the adder of the ALU of the other pipeline has at least one extra input port. Two successive arithmetically data dependent instructions are executed by the larger adder alone, while the smaller adder is used as part of a logic circuit that determines the carry bit for the instruction execution result obtained from the larger adder. The smaller adder is thus efficiently used, in an operation where it would otherwise be idle. The additional logic circuitry necessary to determine the carry bit is thus minimized. This additional logic circuitry uses carry bit outputs of both adders, plus the number of adder inputs where the data is inverted in order to execute the instructions, to determine the ultimate carry bit of the instruction execution data.

8 Claims, 5 Drawing Sheets

EXECUTION OF DATA DEPENDENT ARITHMETIC INSTRUCTIONS IN MULTI-PIPELINE PROCESSORS

BACKGROUND OF THE INVENTION

This invention relates to binary data processors which employ two or more parallel pipelines, and, more specifically, to execution stages thereof which allow for parallel execution of data dependent instructions.

A multi-staged pipeline is commonly used in a single integrated circuit chip microprocessor to process programmed instructions by advancing them one after the other through its serially connected pipeline stages. That is, a different step of the processing of an instruction is accomplished at each stage of the pipeline. For example, one important stage generates from the instruction and other data to which the instruction points, such as data stored in registers on the same chip, an address of the location in memory where an operand is stored that needs to be retrieved for processing. A next stage of the pipeline typically reads the memory at that address in order to fetch the operand and make it available for use within the pipeline. A subsequent stage typically executes the instruction with the operand and any other data pointed to by the instruction. The execution stage includes an arithmetic logic unit (ALU) that uses the operand and other data to perform a calculation, such as addition, subtraction, multiplication, or division, or a logical combination that is specified by the instruction. The result is then, in a further stage, written back into either the memory or into one of the registers. As one instruction is moved along the pipeline, another is right behind it so that, in effect, a number of instructions equal to the number of stages in the pipeline are optimally being simultaneously processed.

More recently, two parallel pipelines have being used. Two instructions may potentially be processed in parallel as they move along the two pipelines. When some interdependency exists between two successive instructions, however, they often cannot be started along the two pipelines at the same time. One such interdependency is where the second instruction requires for its execution the result of the execution of the first instruction. For example, one instruction can call for an operand retrieved from memory to be added to an operand in a register, with the result written back to the same location in memory. The next instruction could then call for a third operand to be subtracted from that result, requiring that same memory location to again be accessed and its data read as part of processing the second instruction. The second instruction must then be held from moving along the stages of the second pipeline until the first instruction has been executed by the first pipeline and the result stored in memory. Only then is one operand required by the second instruction available for retrieval. This obviously slows down the throughput of the processor by not using the parallelism that is provided by the two pipelines.

To overcome this disadvantage, two instructions having a certain types of data dependency have been suggested to be executed simultaneously in a single ALU that has a third input port. In the example of the preceding paragraph, all three operands necessary to execute both instructions would be inputted to the enlarged ALU at one time. Its data output then provides the result of execution of the two instructions. There is then no need to store the intermediate result of the execution of the first instruction. Indeed, this intermediate result is not even calculated. The parallelism provided by two pipelines is then fully utilized to process two successive data dependent instructions.

However, the carry bit output of the enlarged ALU is not usually correct for its data output. Therefore, separate logic is usually provided to determine the carry bit, with a disadvantage of utilizing more space on the integrated circuit and consuming more power. Therefore, it is a primary object of the present invention to provide a technique and circuit implementations thereof that provide the value of such a carry bit with the utilization of fewer components.

It is another object of the present invention to provide an improved technique for determining the value of a carry bit for data resulting from simultaneously executing two arithmetically data dependent instructions.

It is a more general object of the present invention to improve and simplify the simultaneous execution of data dependent instructions in a processor.

SUMMARY OF THE INVENTION

These and other objects of the present invention are accomplished, briefly and generally, by utilizing the two port ALU to receive the operands required to execute the first instruction of an arithmetically data dependent pair of instructions, and then using its carry bit output in a logic circuit that determines the carry bit of the resulting data output of the enlarged ALU. By utilizing the otherwise idle smaller ALU during the time that the larger ALU is executing both instructions, the size of the added logic circuit required to obtain the carry bit is reduced. Further, as part of an improved technique, the logic circuit also uses whether the number of input ports to the two ALUs having their data inverted is even or odd to determine the value of the carry bit.

Additional objects, advantages, and features of the present invention will become apparent from the following description of its preferred embodiments, which description should be take in conjunction with the accompanying drawings.

DESCRIPTION OF THE PRIOR ART

Figure 1A:
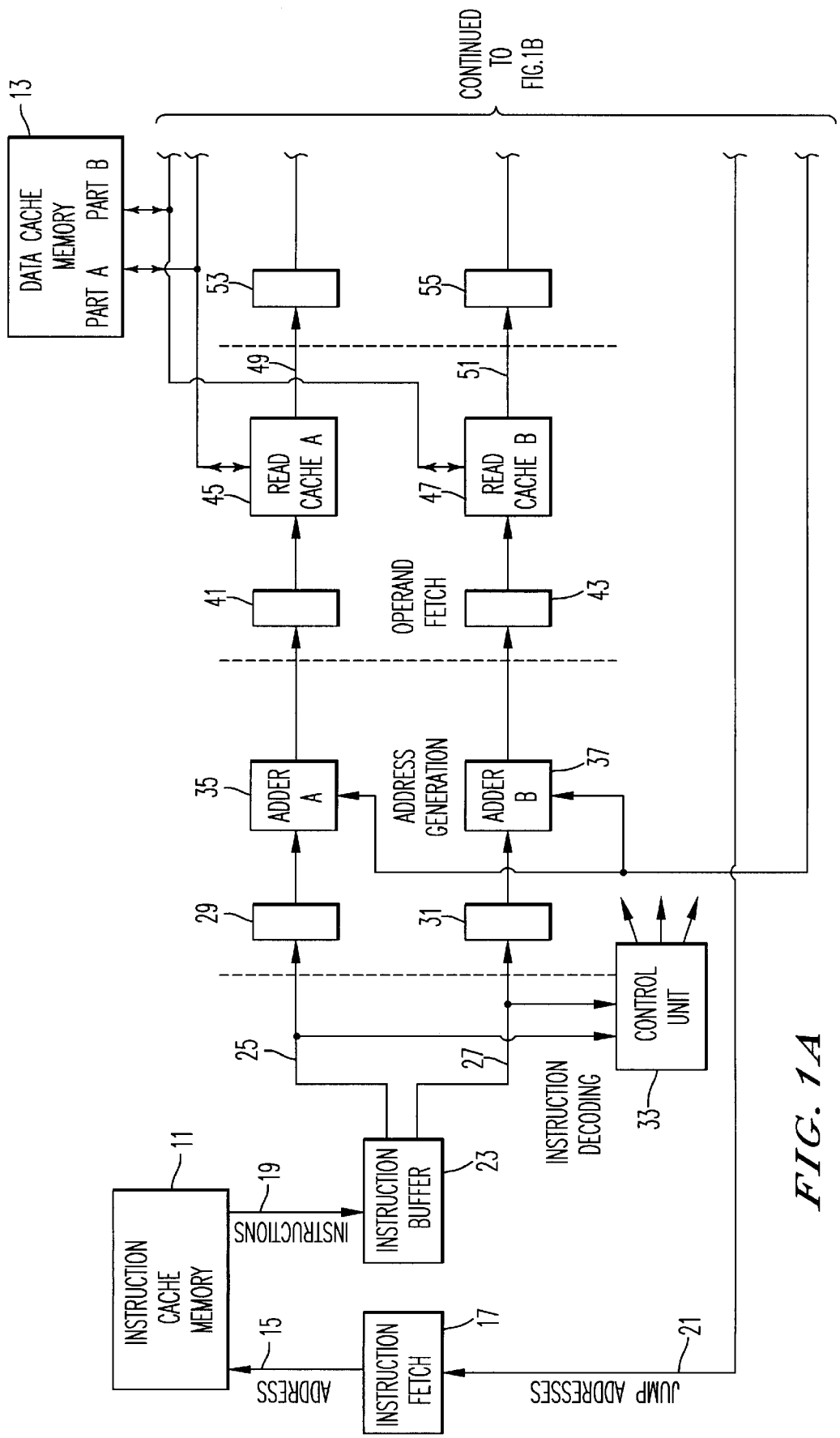
FIG. 1 illustrates, as background, a prior art processor using two parallel multi-stage pipelines.
Figure 1B:
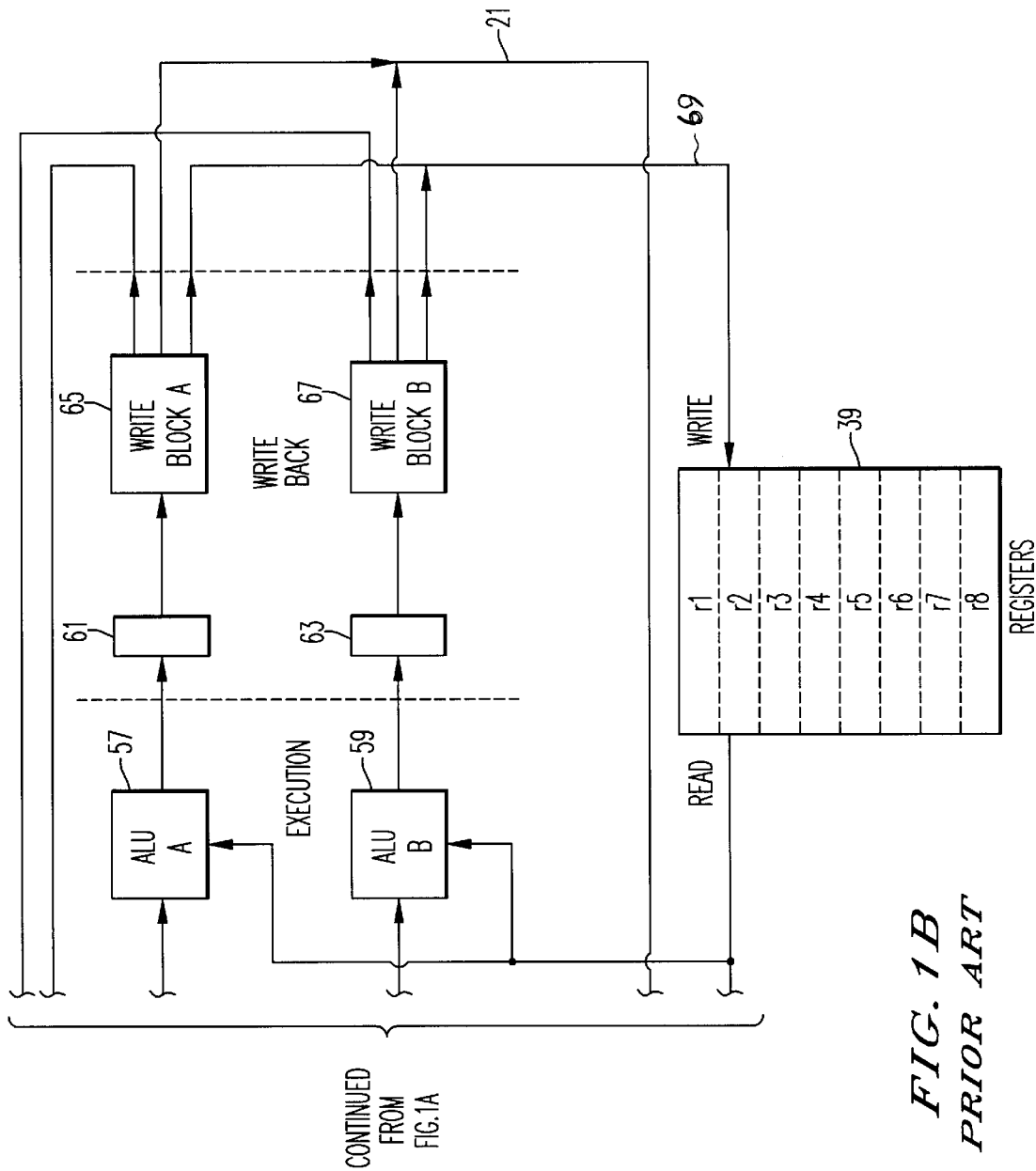

As background, an architecture of a prior art microprocessor with two pipelines, each having multiple stages, is described with respect to FIG. 1. What is shown in FIG. 1, is provided on a single integrated circuit chip. That chip includes some on-board memory, usually cache memory, such as an instruction cache 11 and a data cache 13. The instruction cache 11 stores instructions that are frequently being executed, and the data cache 13 stores data that is frequently being accessed to execute the instructions. The instruction and data cache memories 11 and 13 are sometimes combined into one memory but more often are provided as physically separate memories. Access to dynamic random access memory (DRAM), magnetic disk drives, and other forms of mass storage, currently all off the microprocessor chip, is not shown in the figures of the present application but is operated with the on-board cache memories in a standard manner.

Addresses of instructions and memory are generated in a circuit 15 by an instruction fetch block 17. A main component of the instruction fetch block 17 is a program counter that increments from a starting address within the cache memory 11 through successive addresses in order to serially read out in a circuit 19 successive instructions stored at those addresses. The instruction fetch block 17 is also responsive to an address in a circuit 21 to jump out of order to a specified beginning address from which the program counter then counts until another jump address is received.

The instructions read one at a time out of the cache memory 11 are stored in a buffer 23 that decodes them sufficiently so that one instruction is passed through circuits 25 and another instruction is passed through circuits 27 at the same time. The circuits 25 and 27 are the beginnings of the parallel pipeline stages, with the instruction buffer 23 providing an initial stage to each of these pipelines. Latches 29 and 31 are included in the paths of each of the two pipelines for temporarily storing the instructions that are being separately processed by the two pipelines.

Each of these instructions is also connected with a control unit 33 having outputs that are connected (not shown for simplicity) to most of the other blocks of the pipeline in order to control their operation. The control unit 33 decodes each of the instructions presented in the circuits 25 and 27 in order to specify how each of the stages of the two pipelines is to operate to execute that instruction. For example, a signal from the control unit 33 normally latches the instructions in the circuits 25 and 27 in the respective latches 29 and 31. However, there are circumstances where both instructions are not allowed to proceed down the pipelines at the same time. For example, the instruction in the circuit 27 may require a result of the execution of the instruction and circuit 25. Thus, the instruction in the circuit 27 is not stored in the latch 31 at the same time as the instruction is stored in the latch 29. Rather, the instruction in the circuit 27 is entered into a pipeline in a subsequent cycle, so the result of the execution of the first instruction is available to it when required.

Each of the pipelines includes an address generation stage, their primary components being adders 35 and 37. The purpose of each of these adders is to calculate an address in the data cache memory 13 where an operand is to be found that is necessary to execute the instruction. The address is calculated by each adder from information provided in the instruction itself or data read from one of several registers 39 that are also provided as part of the microprocessor integrated circuit. According to one architectural standard, eight such registers r1 through r8 are included, while more registers are used in other architectural standards. An instruction often requires data to be read from at least one of the registers in the course of calculating the address.

The calculated memory addresses of the two instructions being processed in parallel are then stored in latches 41 and 43. These addresses are then applied to the data cache memory 13 through interfaces 45 and 47 to retrieve operands from the address locations in circuits 49 and 51. These operands are then temporarily stored in latches 53 and 55 at the beginning of the next stage of the pipelines.

This next stage is the execution stage that includes two ALUs 57 and 59. The operands read from the data cache memory 13, other data stored in the registers 39, and data provided in the instruction itself are all used by the ALUs 57 and 59 in the manner specified by the individual instructions being executed in the respective pipelines. The results of the arithmetic and/or logic operations performed in the execution stage are then temporarily stored in latches 61 and 63, at the beginning of the next stage of each pipeline.

That final stage includes blocks 65 and 67 for writing back the result of the execution into either the cache memory 13 or one of the registers 39. The pipeline utilizing the block 65 writes to the cache memory 13 through its port A, and the second pipeline, through the block 67, writes to the cache memory 13 through its port B.

Figure 2:
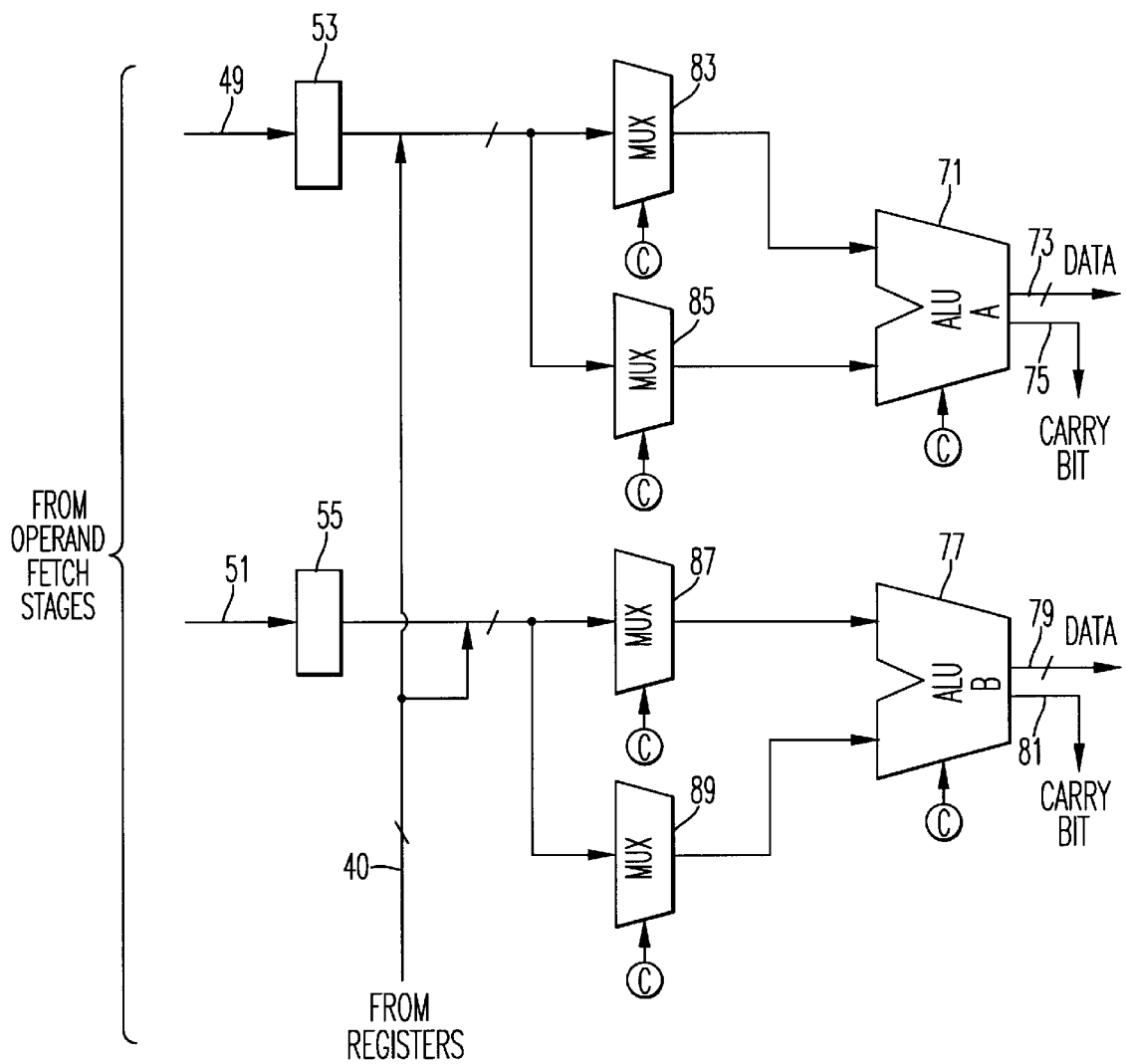
FIG. 2 shows a typical structure of the execution stages of the pipelines of the processor of FIG. 1 in the prior art.

Referring to FIG. 2, an overview block diagram of the execution stages of the pipelines of FIG. 1 is given. One pipeline includes an ALU 71 that has a binary data output 73 and a carry bit output 75. The other pipeline has an ALU 77 that has similar data and carry bit outputs 79 and 81. Each of the ALUs 71 and 77 has two inputs. Those of the ALU 71 come from outputs of respective multiplexers 83 and 85. The inputs of the ALU 77 are connected to outputs of multiplexers 87 and 89. Inputs to the pairs 83, 85 and 87, 89 of multiplexers come from respective latches 53 and 55 and contents of the registers 39. Each of these multiplexers selects for its respective ALU input an operand read from the memory 13 in the preceding stage, one read from one of the registers 39 or one contained within the instruction itself. This selection is made for each input in accordance with the requirements of the instruction being executed. Those requirements are decoded within the control unit 33 and control signals issued from it to each of the multiplexers.

The control unit 33 (FIG. 1) ideally causes one instruction to be advanced through each of the five illustrated pipeline stages (some processors have more) in one processing cycle per stage (each processing cycle being one or more clock cycles). Five instructions are therefore in various stages of processing during any one processing cycle. However, this rate cannot be met all the time because some instructions require more than one cycle to be processed by one or more of the stages, thus slowing down the progression of the instructions along the stages. A delay in the processing of one instruction causes all those behind it in the same pipeline to be delayed as well. The instructions are usually advanced in lock step though the pipelines, and a subsequent instruction of a series of instructions is not allowed to exit one pipeline before a previous instruction being processed in the other pipeline. Two successive instructions are usually advanced together through the stages of respective pipelines unless there is some dependency between them, in the sense that the second instruction requires a result of the first instruction before the second instruction can be executed. In such a case, the second instruction is generally held in one of the stages until the first instruction has been fully processed and its result written into the memory 13 or one of the registers 39. That result is then used in the address generation, operand fetch or execution stages of the pipeline processing the second instruction, depending upon the type of dependency that exists between the two instructions. While the first instruction is being processed by one pipeline, the second instruction is held in the appropriate one of these stages of the second pipeline to await the result of the processing of the first instruction.

DESCRIPTION OF THE PREFERRED EMBODIMENT

Figure 3:
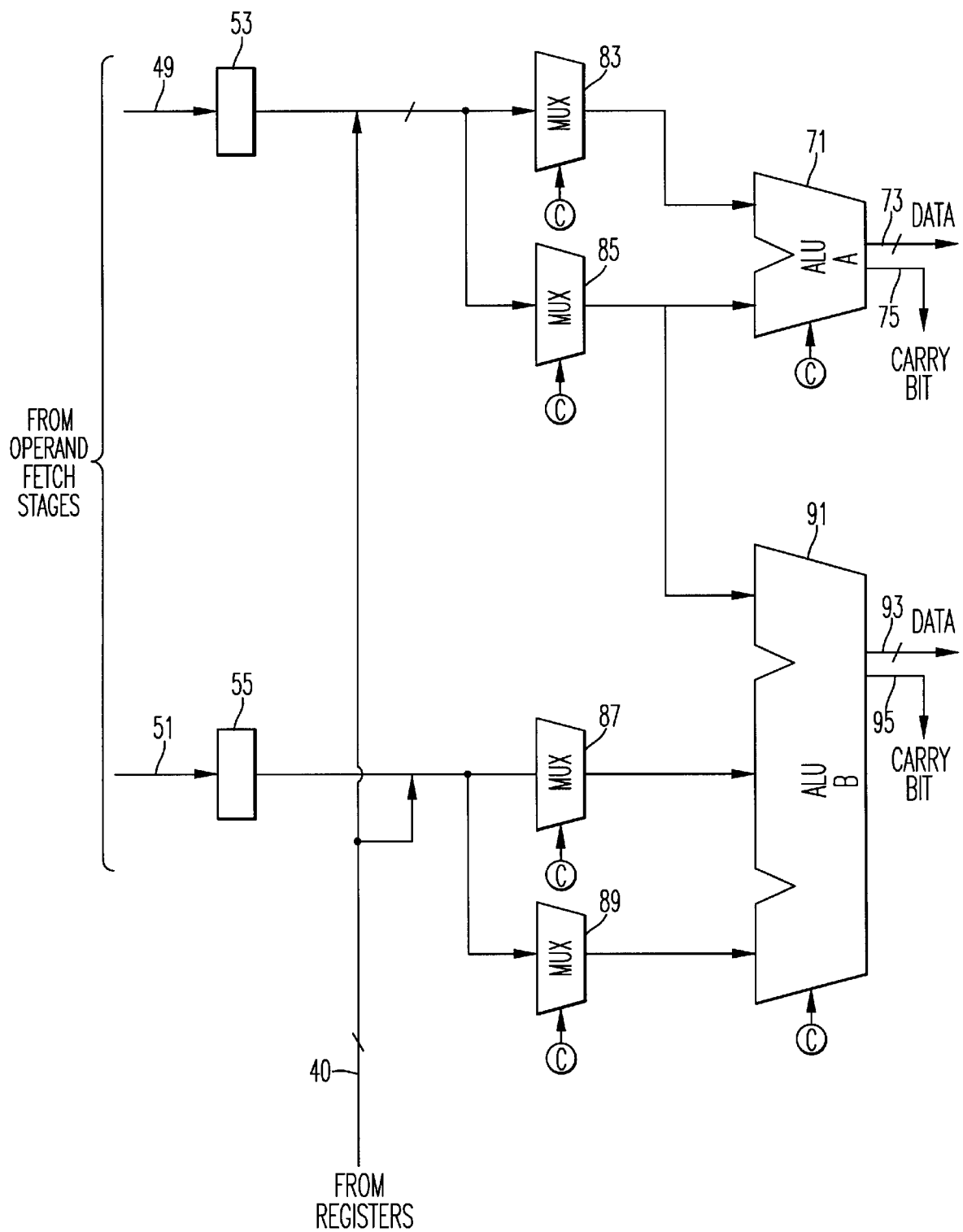
FIG. 3 the execution stages of the pipelines of the processor of FIG. 1 when the present invention is implemented.

Referring to FIG. 3, an improvement in the execution stages of the pipelines of FIG. 1 is shown in which the present invention may be implemented. Elements of FIG. 3 that are common with those of FIG. 2 are given the same reference number. The primary difference is the use of a three-input ALU 91, having a binary data output 93 and a carry bit output 95, in place of the two-input ALU 77. The third port of the ALU 91 is connected to the output of the multiplexer 85. One input of each of the ALUs 71 and 91 receives the same operand when executing the two instructions that have reached the execution stages of the respective pipelines. This allows parallel execution of two instructions with certain types of data dependency, rather than having to hold the second instruction until the first instruction is fully executed.

As an example of such data dependency, consider a first instruction that calls for adding the value of a number in register r1 (FIG. 1) to the value of a number at a given location in the data memory 13 and then write the result back into the register r1, and a second instruction that requires reading that new result from the register r1 and then subtracting it from the value stored in register r4. Since the second instruction is dependent upon the first, the second instruction is typically held at the beginning of the pipeline for at least one operational cycle while the first instruction is processed. Enough time must elapse to allow the first instruction to write the new value in the register r1 before the second instruction causes it to be read.

However, by providing the third input port to the ALU 91 and by connecting it to a data source through the multiplexer 85 that is different than the data selectable for the other two input ports of the ALU 91, both of these dependent instructions can be executed at the same time. Rather than the first instruction writing its resulting data back into the register r1, both instructions are executed together through the two pipelines by inputting to the ALU 91 the two operands that are specified to used by the first instruction. That is, rather than the ALU 91 receiving an input that is the result of execution of the first instruction, it receives in two inputs the operands which were used to generate that result. In the example given above, two of the inputs of the ALU 91 are given the original data in r1 plus that in memory which are called for by the first instruction, plus the data in the register r4. Both instructions are then executed at the same time by the ALU 91. This technique of using a three input port ALU provides these advantages with a microprocessor having only two pipelines as well as in other architectures.

In addition to calculating the data result of a combination of operands, the ALU must determine its carry bit. Normally, each ALU provides the carry bit as an output. If two data dependent instructions are executed one at a time in order, as done with the processor of FIGS. 1 and 2, the ALU carry bit outputs provide the correct result. But when two data dependent instructions that each require arithmetic operations are simultaneously executed in the ALU 91 alone (FIG. 3), its carry bit output is not always accurate. Therefore, additional logic is provided in the execution stages to calculate the correct carry bit to accompany the binary data result of executing both instructions.

Figure 4:
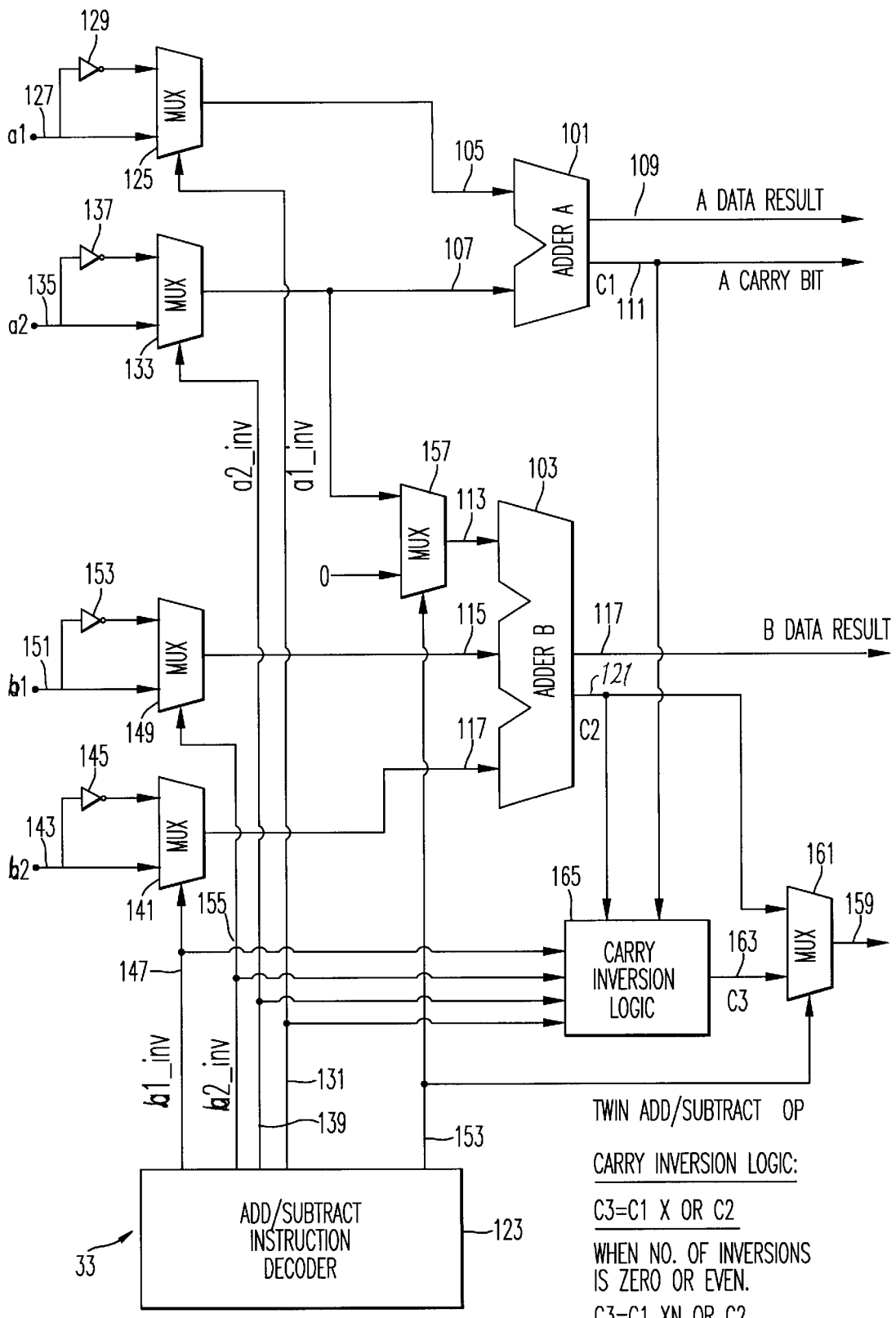
FIG. 4 is a schematic of portions of the pipeline execution stages of FIG. 3 that carry out the present invention.

An example of such carry bit logic is illustrated in FIG. 4 for an embodiment wherein the arithmetic operations performed by each ALU are limited to addition and subtraction. A two port adder 101 and associated components are a part of the ALU 71 (FIG. 3). Similarly, a three input port adder 103 and associated components are a part of the ALU 91. As part of the logic that calculates the carry bit, the two input port adder 101, which is not used to perform the addition or subtraction of input operands when executing data dependent instructions, is utilized in order to minimize the space required for such logic. Of course, the adder 101 is used to execute instructions that are not data dependent, so is necessary as part of the ALU 71. But when arithmetically data dependent instructions are being executed, when the adder 101 is not necessary to obtain the data result from the adder 103, the adder 101 is employed as part of the circuitry that calculates the carry bit for this result.

Referring to FIG. 4, the adder 101 has two inputs 105 and 107, with a data output 109 and an output 111 of a carry bit C1. Similarly, the adder 103 has three inputs 113, 115 and 117, with a data output 119 and an output 121 of a carry bit C2. Two inputs of each adder include inverters controlled by an addition/subtraction instruction decoder 123 of the control unit 33 (FIG. 1) to selectively invert operands to give them a negative sign. The input 105 of the adder 101 is connected to an output of a multiplexer 125 that selects either the operand a1 in a line 127 or an inverted a1 through an inverter 129, depending upon whether a control signal a1_inv in a line 131 from the decoder 123 is asserted or not. The second input 107 of the adder 101 is similarly connected through a multiplexer 133 to a line 135 carrying an operand a2 directly or through an inverter 137, depending upon the state of a control signal a2_inv in a line 139. Similarly, the input 117 of the adder 103 is connected through a multiplexer 141 to an input 143 of an operand b1 and inverter 145, with a control signal b1_inv in a line 147. The input 115 is similarly connected through a multiplexer 149 to an input 151 of an operand b2 and an inverter 153, with a control signal b2_inv in the line 155. The control signals a1_inv, a2_inv, b1_inv and b2_inv are individually asserted by the instruction decoder 123 when respective operands a1, a2, b1 and b2 are to be inverted in order to carry out the arithmetic operation specified by the two instructions A and B being executed at the same time.

The signal connected to the third input 113 of the adder 103 is selected by a multiplexer 157 between signal of the input 107 of the adder 101 and a binary 0, in response to a control signal in a line 153. That control signal, designated a "twin add/subtract op," is asserted when two instructions are being simultaneously executed in the two pipelines that have an arithmetic dependency of their data. The decoder 123 determines when this control signal is asserted. When the addition or subtraction of three operands necessary to execute two data dependent instructions is being carried out by the adder 103, its third input 113 is connected with the second input 107 of the adder 101. Otherwise, this third input 113 is set at logical 0 to effectively disable it.

When executing such a data dependent instruction, a carry bit that accompanies the calculated result in the output line 119 is provided in a line 159 as an output of a multiplexer 161. The multiplexer 161 selects either the carry bit output C2 from the adder 103 or a carry bit C3 in a line 163 that is provided by a logical circuit 165. This selection is made in response to the twin add/subtract op signal in line 153. When that signal is asserted, as the result of data dependent instructions being executed simultaneously, the carry bit C3 is connected to the output line 159. When not asserted, resulting in the adders 101 and 103 operating essentially independently to execute two instructions at the same time, the output 159 is connected with the carry bit C2 of the adder 103. Therefore, when the twin add/subtract op control signal is not asserted, the data output 109 and carry bit output C1 in the line 111 are utilized directly as the result of executing a first instruction, and the adder 103 provides the data and carry bit C2 outputs 119 and 121, respectively, as a result of executing a second instruction without being dependent upon execution of the first instruction. But when two instructions are being executed at the same time by the three input adder 103, the data output 109 of the adder 101 is not utilized but its carry bit C1 is used as an input to the logic 165. The carry bit C1 is calculated from the two operands a1 and a2 in the same manner as if the first A instruction was being executed by itself.

The logical circuit 165 receives inputs from the carry bits C1 and C2, as well as the inverting control signals a1_inv, a2_inv, b1_inv and b2_inv. The output carry bit C3 is a different logical combination of the carry bits C1 and C2 that depends upon whether the total number of inverting control signals being asserted to execute the instructions is even or odd. If the number of input signal inversions is zero or even, the circuit 165 outputs C3 as an exclusive OR combination of the carry bits C1 and C2 (C1 XOR C2). If the number of input signal inversions is odd, the circuit 165 outputs C3 as an exclusive NOR combination of the carry bits C1 and C2 (C1 XNOR C2).

The techniques of simultaneously executing two data dependent instructions have been described with respect to a rather basic processor having two multi-staged pipelines, for ease of explanation. These techniques and their circuit implementations are not limited to the described application, however, but also can be used in other processor architectures. An example of an alternative architecture is given in U.S. application Ser. No. 09/062,804, filed Apr. 20, 1998, by Kenneth K. Munson, and entitled "Dynamic Allocation of Resources in Multiple Microprocessor Pipelines." This prior application is incorporated herein in its entirety by this reference. The carry bit logic circuitry of FIG. 4 herein can be added to the execution "EX" stages of two of its pipelines, as can best be seen from FIG. 7 of the prior application, where ALUs 101 and 103 of FIG. 4 of the present application correspond generally to ALUs 311 and 313, respectively, of FIG. 7 of the prior application.

Although the various aspects of the present invention have been described with respect to its preferred embodiment, it will be understood that the invention is entitled to protection within the full scope of the appended claims.

It is claimed:

1. A processor capable of simultaneously executing arithmetically data dependent instructions to provide an execution result and a corresponding result carry bit, the processor comprising:

a first adder that outputs a first carry bit in response to operands received from a first instruction;

a second adder that receives operands from a second instruction and that receives at least one operand from the first instruction when the first and second instructions are arithmetically data dependent, and that outputs the execution result; and a logic circuit operating in response to the first carry bit to generate the result carry bit.

2. The processor of claim 1, wherein:

the second adder outputs a second carry bit; and the logic circuit operates in response to both the first carry bit and the second carry bit to generate the result carry bit.

3. The processor of claim 2, additionally comprising:

individually controllable inverters of the operands of the first and second instructions that are operable in response to arithmetic operations required by the first and second instructions, wherein the logic circuit additionally operates to generate the result carry bit from a logical combination of the first and second carry bits, said logical combination depending upon whether a total number of operands that are inverted when executing the first and second instructions is even or odd.

4. A processor having a control unit with an instruction decoder, and at least first and second instruction processing pipelines that each have multiple serial connected stages including an execution stage, comprising:

the execution stage of the first pipeline including a first adder having first and second input ports, a first binary data output and a first carry bit output, the execution stage of the second pipeline including a second adder having third, fourth and fifth input ports, a second binary data output and a second carry bit output, a signal path between the third input port of the second adder and the second input port of the first adder, inverting circuits respectively connected in series with the first, second, third and fourth input ports and individually responsive to control signals from the control unit instruction decoder to individually control whether data applied to said input ports are inverted or not, and logic circuit that generates a result carry bit corresponding to an execution result in the second binary data output upon execution of first and second arithmetically data dependent instructions, wherein:

data of the first instruction is applied during a given processing cycle to the first and second input ports, data of the second instruction is applied during said given processing cycle to the fourth and fifth input ports, said logic circuit is responsive to the first carry bit output, the second carry bit output and whether a number of the inverting circuits that are set by the control unit to invert their associated adder input signals during said given processing cycle is odd or even.

5. The processor of claim 4, wherein:

the logic circuit operates to generate the result carry bit from a first logical combination of the first and second adder carry bit outputs when the number of inverted input signals is zero or even, and the logic circuit operates to generate the result carry bit from a second logical combination of the first and second adder carry bit outputs when the number of inverted input signals is odd.

6. The processor of claim 5, wherein:

the first logical combination is an exclusive OR; and the second logical combination is an exclusive NOR.

7. A method of simultaneously executing first and second arithmetically data dependent instructions to provide an execution result and a corresponding result carry bit, the method comprising:

obtaining operands required by each of the first and second instructions for their execution, applying the operands of the first instruction to two input ports of a first adder in order to generate a first carry bit, applying at least some of the operands of each of the first and second instructions to more than two input ports of a second adder in order to generate the execution result, and determining the result carry bit from values of the first and second carry bits.

8. The method of claim 7, wherein:

applying the operands to the input ports of the first and second adders includes inverting individual ones of the operands as required to execute the first and second instructions, and determining the result carry bit additionally includes determining whether a number of operands that are inverted at the input ports of the first and second adders is even or odd.

* * * * *